United States Patent [19]

Kowalski et al.

[11] Patent Number: 4,468,498

[45] Date of Patent: * Aug. 28, 1984

[54] SEQUENTIAL HETEROPOLYMER DISPERSION AND A PARTICULATE MATERAL OBTAINABLE THEREFROM, USEFUL IN COATING COMPOSITIONS AS A THICKENING AND/OR OPACIFYING AGENT

[75] Inventors: Alexander Kowalski, Glenside; Martin Vogel, Jenkintown; Robert M. Blankenship, Lansdale, all of Pa.

[73] Assignee: Rohm and Haas Company, Philadelphia, Pa.

[*] Notice: The portion of the term of this patent subsequent to Jan. 24, 2001 has been disclaimed.

[21] Appl. No.: 352,397

[22] Filed: Feb. 25, 1982

Related U.S. Application Data

[60] Division of Ser. No. 158,759, Jun. 12, 1980, abandoned, which is a continuation-in-part of Ser. No. 52,280, Jun., 1979, abandoned.

[51] Int. Cl.$^3$ .......................................... C08F 265/02
[52] U.S. Cl. .................................. 525/301; 523/201; 524/460; 525/901
[58] Field of Search ............... 525/301, 902; 523/201; 524/460

[56] References Cited

U.S. PATENT DOCUMENTS 3,282,876 11/1966 Williams .............................. 428/407
3,297,621 1/1967 Taft ..................................... 260/29.6
4,151,143 4/1979 Blank ................................... 524/533

*Primary Examiner*—Paul R. Michl
*Attorney, Agent, or Firm*—Michael B. Fein

[57] ABSTRACT

The present invention is concerned with the production and use of water-insoluble particulate heteropolymers made by sequential emulsion polymerization in dispersed particles of which a "core" of a polymeric acid is at least partially encased in a "sheath" polymer that is permeable to a volatile base, such as ammonia or an organic amine, adapted to cause swelling of the core by neutralization. The aqueous dispersion of the acid-containing core/sheath particles is useful in making water-base coating compositions wherein it may serve as the binder or as a part thereof. In that use, the heteropolymer dispersion serves to provide desirable rheological control of the coating compositions when a volatile base is used to at least partially (to a pH of at least 6) neutralize the heteropolymer. Thus, the heteropolymer dispersion can serve as a thickener, or part thereof in coating compositions, such as water-base paints.

For convenience of description herein, the terms "core", "sheath", and "core/sheath polymer" are frequently used to refer to the distinct functional components of the individual polymer particles of the essential "mode" of the heteropolymers of the present invention even though in actuality, the components of the polymer particles thereof may not have the precise arrangement implied by this terminology.

15 Claims, No Drawings

SEQUENTIAL HETEROPOLYMER DISPERSION AND A PARTICULATE MATERAL OBTAINABLE THEREFROM, USEFUL IN COATING COMPOSITIONS AS A THICKENING AND/OR OPACIFYING AGENT

RELATED APPLICATIONS

This is a divisional of Ser. No. 158,759 of June 12, 1980, abandoned, which is in turn a continuation-in-part of Ser. No. 52,280, filed June 26, 1979, abandoned. It is related to another divisional of that same application being filed today.

BACKGROUND OF THE INVENTION

It has heretofore been suggested to make microvoid-containing polymer particles to serve as hiding or opacifying agents in coating and molding compositions. Among the various procedures heretofore used, organic solvents and blowing agents occupy a prominent place therein.

Kreider U.S. Pat. No. 3,819,542, though containing no disclosure of the production of microvoid-containing polymer particles to serve as opacifying agents in coating compositions, is of background interest to show the use of organic solvents in a latex coating composition to produce a cellular film on drying. More specifically Kreider uses a mixture of a primary organic solvent, such as xylene, immiscible with the aqueous phase of the latex coating composition and a secondary organic solvent, such as propylene glycol, at least partially water-miscible and having lesser volatility and lesser solvating capacity for the polymer in the latex than the primary solvent. Upon evaporation of the primary solvent, a cellular film is obtained, the secondary solvent increasing the opacification.

Kurth et al. U.S. Pat. No. 3,875,099 discloses preparation of sequential acrylic polymers containing 0.5–2.5% of an alpha, beta-unsaturated carboxylic acid. The bulk of the acid is introduced in the early portion of the polymerization. Of the 11 examples, only Ex. 1 superficially resembles the film-forming thickener of the present invention. There is about 0.5% acid monomer over all, the first stage monomers containing about 13% methacrylic acid. The core/sheath weight ratio is in the neighborhood of 1/25. The core and sheath monomers are basically the same in this example (about 50:50 butyl acrylate methyl methacrylate), but the acid in the core confers a $T_i$ of about 30°–35° C., the sheath having a calculated $T_i$ of about 5°–10° C. Example 1 of Kurth et al. involves the use of a large amount of surfactant and a small amount of peroxy initiator, both of which are believed to normally result in extremely small latex particles. In our experience, this recipe would be expected to give core particles of about 0.04–0.05 micron average diameter, with the overall core-shell particle diameter being about 0.1–0.15 micron. The soft core, the small particle size, and the high temperature polymerization each may contribute to incomplete encapsulation. As shown by a comparative example herein below, the first stage of the Kurth et al. Ex. 1 is not adequately encapsulated.

Fantl et al, U.S. Pat. No. 3,401,134 discloses that cellulose ethers and water-soluble gums have been used to thicken aqueous coating compositions based on various polymer latices which composition for application, as by brushing, rolling, or the like. Fantl et al disclose that improved aqueous polymer dispersions are obtained by delaying the incorporation of acid monomer into the copolymer until at least 70% of the other monomers have been polymerized, asserting that the acid mer units are thereby oriented to the surface of the polymer particles and the acid copolymer thus obtained has the property of increasing in viscosity when the addition of a base, such as ammonia, raises the pH to 8 to 12.

DESCRIPTION OF THE INVENTION

In accordance with the present invention, sequential emulsion polymerization in an aqueous medium has been applied to the formation of an aqueous dispersion of water-insoluble hetero-polymer particles comprising (1) an ionic core polymer containing ionizable acid groups making the core swellable by the action of a swelling agent consisting essentially of an aqueous liquid or a gaseous medium containing a volatile base to at least partially neutralize (to a pH of at least about 6 to 10) the acid core polymer and thereby to cause swelling by hydration thereof and (2) a sheath polymer on the core, the sheath being permeable to the swelling agent. The composition of sheath polymer in the preferred embodiments is such as to render it permeable at ambient temperature (e.g. at room temperature of about 20° C.) or at moderately elevated temperature, such as up to about 80° C. to about 120° C., to a volatile neutralizing base, such as ammonia, or an organic neutralizing base, such as a lower aliphatic amine, e.g., triethylamine, diethanolamine, triethanolamine, morpholine and the like, to allow swelling of the acid core polymer by such volatile bases in aqueous or gaseous media, but not permeable to fixed or permanent bases, such as sodium, potassium, calcium or magnesium hydroxide, so that films deposited from aqueous coating compositions comprising a volatile base-swollen core of the core/sheath polymer upon drying and resultant (at least partial) removal by volatilization of the base are not damaged by any permanent base present in the substrate coated or in solutions used later for cleaning the films.

The term "sequentially emulsion polymerized" or "sequentially emulsion produced" refers to polymers (which term includes copolymers as well as homopolymers) which are prepared in aqueous medium by an emulsion polymerization process wherein the dispersed polymer particles of a preformed latex or "seed" polymer in the aqueous medium are increased in size by deposition thereof of polymerized product of one or more successive monomer charges introduced into the medium containing dispersed particles of the preformed latex in one or more subsequent stages. When there is no additional emulsifier (or surfactant) introduced with the subsequent monomer charges, essentially no additional micelles are formed during the subsequent stages of polymerization and practically all of the monomer charges added later polymerize onto the latex polymer particles present at the time of charging and the resulting polymer product may appropriately be called a "unimodal" sequentially polymerized heteropolymer. However, a "polymodal", for instance a "dimodal", "trimodal", or "multimodal" heteropolymer may be obtained by introducing additional emulsifier or surfactant with one (to produce a dimodal) or more (to produce tri-, tetramodal, etc.) of the subsequent charges. In such instances, the monomer charge accompanied by additional surfactant is partly polymerized on the dispersed polymer particles already present and partly polymerized on the additional micelles created by the additional surfactant, the relative proportion of the monomer charge contributing to the two effects being generally related to the amount of surfactant added with the monomer charge.

In this type of polymerization, all of the monomer of each succeeding stage or phase is attached to and intimately associated with the dispersed particles resulting from the immediately preceding stage or phase when no additional surfactant is added in the subsequent stages. When additional micelle-forming surfactant is added in a particular monomer charge, part of the monomer in the charge is so attached and intimately associated with the polymer particles present in the system at the time of monomer/surfactant addition in part produces additional dispersed particles, yielding a multimodal heteropolymer. Although the exact nature of this attachment is not known, and while it may be chemical or physical or both, the sequentially prepared polymers or copolymers of the present invention are characterized by and or made by a process in which the total particle content is substantially predetermined, in terms of number, by the use of a preformed latex to provide an initial dispersed particle content and either (1) avoiding the addition of surfactant with the subsequent monomer charges whereby a monomodal or unimodal heteropolymer is obtained containing essentially the same number of dispersed polymer particles as the initial latex or (2) incorporating a limited amount of additional emulsifying surfactant in one or more of the subsequently added monomer charges to produce a multimodal or polymodal polymer dispersion in which the number of dispersed polymer particles derived by attachment or intimate association with the dispersed polymer particles of the initial or seed latex is the essential or significant mode by virtue of its "large-size" particles and the dispersed polymer particles produced on other micelles formed by including surfactant in one or more of the subsequent monomer charges provide a second and/or third, and so on mode, all such additional modes, whether one, two, three, or more being relatively insignificant with respect to the essential mode. In multimodal polymers made in accordance with the present invention, the essential or "large-size particle" mode constitutes at least about 25% of the total amount of dispersed polymer particles in terms of weight. A preferred embodiment of multimodal product is a bimodal polymer in which the essential or significant mode derived from the dispersed particles of initial, preformed seed latex constitutes at least about 75% to 85% of the total weight. The essential mode may simply be referred to as the "main" mode regardless of the proportion of such mode in multimodal dispersion because it is the significant mode, but in the preferred embodiment the essential mode or main mode is also the predominant mode. The first stage of monomer charge containing additional surfactant to prepare a multimodal product may be at the time of any of the successive monomer charges after at least about 10% to 50% by weight of the total monomer or monomers to be polymerized on the particles of the initial preformed latex have been so polymerized.

In the multistage sequential emulsion polymerization with which the present invention is concerned, the term "seed" polymer is used to refer to an aqueous emulsion polymer dispersion which may be the initially-formed dispersion, that is the product of a single stage of emulsion polymerization or it may be the emulsion polymer dispersion obtained at the end of any subsequent stage except the final stage of the sequential polymerization. Thus, an alkali-swellable polymer which is herein intended to be provided with a sheath by one or more subsequent stages of emulsion polymerization may itself be termed a seed polymer for the next stage wherein the sheath-forming polymer is deposited on such seed polymer particles.

The core polymer may be the product of aqueous emulsion polymerization of one or more monoethylenically unsaturated monomers containing a group of the formula —HC=C< and a carboxylic acid group. Suitable acid monomers include acrylic acid, methacrylic acid, (meth)acryloxypropionic acid, itaconic acid, aconitic acid, maleic acid or anhydride, fumaric acid, crotonic acid, monomethyl maleate, monomethyl fumarate, and monomethyl itaconate.

The core polymer may be obtained by the emulsion homopolymerization of such an acid monomer or by copolymerization of two or more acid monomers. However, in preferred embodiments, an acid monomer or a mixture of acid monomers is copolymerized with one or more ethylenically unsaturated monomers of non-ionic character (that is, having no ionizable group) having one or more ethylenic unsaturated groups of the formula $H_2C=C<$.

The preferred acid monomers that may be used in providing an alkali-swellable core are acrylic acid and methacrylic acid and mixtures thereof; other preferred acid monomers that may be used include acryloxypropionic acid, methacryloxypropionic acid, acryloxyacetic acid, methacryloxyacetic acid, and monomethyl acid itaconate.

Examples of nonionic monoethylenically unsaturated monomers include styrene, vinyltoluene, ethylene, vinyl acetate, vinyl chloride, vinylidene chloride, acrylonitrile, (meth)acrylamide, various ($C_1$–$C_{20}$)alkyl or ($C_3$–$C_{20}$)alkenyl esters of (meth)acrylic acid, (The expression (meth)acrylic acid is intended to serve as a generic expression embracing both acrylic acid and methacrylic acid.) e.g., methyl methacrylate, methyl acrylate, ethyl (meth)acrylate, butyl (meth)acrylate, 2-ethylhexyl (meth)acrylate, benzyl (meth)acrylate, lauryl (meth)acrylate, oleyl (meth)acrylate, palmityl (meth)acrylate, and stearyl (meth)acrylate. In general, core copolymers containing at least about 5%, preferably at least 10%, by weight of acid mers have practical swellability for the purposes of the present invention but there may be instances wherein, because of the hydrophobicity of certain comonomers or combinations thereof in conjunction with the hydrophobic/hydrophilic balance of a particular acid monomer, the copolymer may require somewhat less than 5 weight percent of acid monomer or considerably more than 5 weight percent thereof, and in the latter instance, a preferred proportion of acid monomer is at least 10 weight percent based on the total weight of core-producing monomer mixture. As may be seen by the reference to homopolymerization of an acid monomer core, the invention includes a core which contains 100% of the addition polymerizable carboxylic acid. A preferred maximum quantity of acid monomer is about 70% of the total core monomers, by weight.

The core polymer may, and preferably does, comprise as one component thereof a small amount of a polyethylenically unsaturated monomer, such as ethylene glycol di(meth)acrylate, allyl (meth)acrylate, 1,3-butane-diol di(meth)acrylate, diethylene glycol di(- meth)acrylate, trimethylol propane trimethacrylate, or divinyl benzene, the proportion thereof being in the range of about 0.1% to 20%, preferably 0.1% to about 3%, by weight, based on the total monomer weight of the core, the amount used generally being approximately directly proportional to the amount of acid monomer used. Butadiene is exceptional in that it often functions as a monoethylenically unsaturated monomer especially in mixtures with styrene so the amount of butadiene, if used, may be as much as 30 to 60 percent by weight of the total core monomer weight.

While the core may be made in a single stage or step of the sequential polymerization and the sheath may be the product of a single sequential stage or step following the core stage, nevertheless, the making of the core component may involve a plurality of steps in sequence followed by the making of the sheath which may involve a series of sequential steps as well.

Thus, the first stage of emulsion polymerization in the process of the present invention may be the preparation of a seed polymer containing small dispersed polymer particles insoluble in the aqueous emulsion polymerization medium. This seed polymer may or may not contain any acid component but provides particles of minute size which form the nuclei on which the core polymer of acid monomer, with or without nonionic comonomer(s), is formed.

As is common to aqueous emulsion polymers, there is used a water-soluble free radical initiator, such as hydrogen peroxide, tert-butyl peroxide, or an alkali metal (sodium, potassium or lithium) or ammonium persulfate or a mixture of such an initiator with a reducing agent, such as a sulfite, more specifically an alkali metal metabisulfite, hydrosulfite, or hyposulfite, or sodium formaldehyde sulfoxylate, to form a redox system. The amount of initiator may be from 0.01 to about 2% by weight of the monomer charged and in a redox system, a corresponding range (0.01 to about 2%) of reducing agent may be used. The temperature may be in the range of about 10° C. to 100° C. In the case of the persulfate systems, the temperature is preferably in the range of 60° to 90° C. In the redox system, the temperature is preferably in the range of 30° to 70° C., preferably below about 60° C., more preferably in the range of 30°–45° C. The proportion of emulsifier may be zero, in the situation wherein a persulfate initiator is used, to about 0.3 weight percent, based on the weight of monomer charged to the first stage of polymerization. By carrying out the emulsion polymerization while maintaining low levels of emulsifier, the subsequent stages of polymer-formation deposit the most-recently formed polymer on the existing dispersed polymer particles resulting from the preceding step or stage. As a general rule, the amount of emulsifier should be kept below that corresponding to the critical micelle concentration for a particular monomer system, but while this limitation is preferable and produces a unimodal product, it has been found that in some systems the critical micelle concentration of the emulsifier may be exceeded somewhat without the formation of an objectionable or excessive number of dispersed micelles or particles. It is for the purpose of controlling the number of micelles during the various stages of polymerization so that the deposition of the subsequently formed polymer in each stage occurs upon the dispersed micelles or particles formed in the previous stages, that the concentration of emulsifier is kept low. However, as pointed out hereinabove, polymodal products may be obtained by including an emulsifier or surfactant in one or more of the later monomer charges.

Any nonionic or anionic emulsifier may be used, either alone or together. Examples of the nonionic type of emulsifier include tert-octylphenoxyethylpoly(39)-ethoxyethanol, and nonylphenoxyethylpoly(40)ethoxyethanol. Examples of anionic emulsifiers include sodium lauryl sulfate, sodium dodecyl benzene sulfonate, tertoctylphenoxyethoxypoly(39)ethoxyethyl sulfate, sodium salt.

The molecular weight of the polymer formed in a given stage may range from 100,000, or lower if a chain transfer agent is used, to several million viscosity average. When 0.1 to 20 weight % of a polyethylenically unsaturated monomer mentioned hereinbefore is used in making the acid polymer, the molecular weight is increased whether or not crosslinking occurs. The use of the polyethylenically unsaturated monomer reduces the tendency of the core polymer to dissolve when the multistage polymer is treated with a swellant for the core. If it is desired to produce an acid polymer having a molecular weight in the lower part of the range, such as from 500,000 down to as low as about 20,000, it is frequently most practical to do so by avoiding the polyethylenically unsaturated monomers and using a chain transfer agent instead, such as 0.05 to 2% or more thereof, examples being a lower alkyl mercaptan, such as sec-butyl mercaptan.

The acid-containing core polymer, whether obtained by a single stage process or a process involving several stages, has an average size of about 0.05 to about 1.0, preferably 0.1 to 0.5, more preferably 0.2 to 0.5 micron diameter in unswollen condition. If the core is obtained from a seed polymer, whether or not the latter contains acid groups or mers, the seed polymer may have an average size in the range of 0.03 to 0.2 micron diameter.

After the acid core is obtained, a subsequent stage or stages of emulsion polymerization is effected to form a sheath polymer on the acid core polymer particles or micelles. This may be performed in the same reaction vessel in which the formation of the core was accomplished or the reaction medium containing the dispersed core particles may be transferred to another reaction container. It is generally unnecessary to add emulsifier unless a polymodal product is desired, but in certain monomer/emulsifier systems for forming the sheath, the tendency to produce gum or coagulum in the reaction medium may be reduced or prevented by the addition of about 0.05 to about 0.5% by weight, based on sheath-forming monomer weight, of emulsifier without detriment to the deposition of the polymer formed on the previously formed core particles.

The monomers used to form the sheath polymer on the acid core particles may be any of the nonionic monoethylenically unsaturated comonomers mentioned hereinbefore for the making of the core. The monomers used and the relative proportions thereof in any copolymers formed should be such that the sheath thereby formed is permeable to an aqueous or gaseous volatile basic swellant for the acid core but not to a permanent base. In spite of their hydrophobicity, the extremely non-polar or low-polar monomers, namely, styrene, α-methyl styrene, vinyl toluene, ethylene, vinyl chloride and vinylidene chloride are useful alone (except in the first stage of sheath formation) or in admixture with more highly polar monomers in the list, such as vinyl acetate. Monomeric mixtures for making the sheath may contain up to about 10% by weight, but preferably not over 5% by weight, of an acid monomer, such as one of the monomeric acids mentioned hereinbefore for making the core. However, the proportion of acid in the sheath polymer should not exceed one-third the proportion thereof in the core polymer. The content of acid monomer serves either or both of two functions, namely stabilization of the final sequential polymer dispersion and assuring permeability of the sheath to a volatile base swellant for the core.

The amount of polymer deposited to form sheath polymer is generally such as to provide an overall size of the multistage polymer particle of about 0.07 to about 4.5 microns, preferably about 0.1 to about 3.5 microns, more preferably about 0.2 to about 2.0 microns, in unswollen condition (that is, before any neutralization to raise the pH to about 6 or higher) whether the sheath polymer is formed in a single stage or in a plurality of stages. In unswollen state, the ratio of core weight to the total weight on average is from 1:4 to 1:100.

The multistage heterogeneous particulate polymer containing the acid core is swollen when the particles are subjected to an aqueous basic swellant that permeates the sheath and expands the core, which expansion may involve partial merging of the outer periphery of the core into the pores of the inner periphery of the sheath and also partial enlargment or bulging of the sheath and the entire particle overall. Suitable swelling agents for acid-containing cores are ammonia, ammonium hydroxide, or a volatile lower aliphatic amine, such as trimethylamine, and triethylamine.

The monomer or monomers of the sheath may be selected to produce a sheath polymer having a relatively moderate to high glass transition temperature. When it has a low glass temperature, that is if its $T_i$ is below 50° C., such as $-40°$ to $+23°$ C., the polymer is especially useful as a thickener for aqueous media, such as various coating compositions including water-base paints to be applied at ambient temperatures with at least partial neutralization by adjustment, whenever needed, to a pH of at least 6 to 10 with a volatile base, and in this situation it is especially useful when it is incorporated, in swollen or unswollen condition (and whenever needed, with subsequent adjustment of pH to raise it to at least 6, and up to about 10 with a volatile base), into the composition as part of a binder. $T_i$ is the apparent second order transition temperature or inflection temperature which is found by plotting the modulus of rigidity against temperature. A convenient method for determining modulus of rigidity and transition temperature is described by I. Williamson, British Plastics 23, 87-90, 102 (September 1950). The $T_i$ value here used is that determined at 300 kg/cm$^2$.

As indicated elsewhere herein, the core is preferably relatively hard, as indicated by calculated or measured core $T_i$, or the core polymer is crosslinked by a polyunsaturated monomer. A useful limit for hardness (or softness) of the core is that less than 40% of butyl acrylate ($T_i$ of between $-50°$ and $-55°$ C.) is used, or no more than an amount of an equivalent monomer is used which would give a comparable $T_i$ when using the same comonomer combination. Thus, for a copolymer of 40% butyl acrylate and 60% methyl methacrylate, the calculated $T_i$ is about 20° C. When ethyl acrylate is substituted for butyl acrylate, a copolymer of 60% ethyl acrylate and 40% methyl methacrylate gives a calculated $T_i$ of about 17° C. Of course, the acid monomer confers a higher $T_i$. When using different monomer compositions, particularly with crosslinkers, this rule-of-thumb is not always strictly applicable. Nevertheless, it is a useful guideline.

The heteropolymer dispersions of the present invention are useful in aqueous coating compositions, such as water base paints based on vinyl addition polymer latices, including the acid-containing acrylic emulsion copolymer dispersions of the Conn et al U.S. Pat. No. 2,795,564, and the polyvinyl acetate, butadiene-styrene latices mentioned as part of the prior art in Fantl et al. The heteropolymer dispersions of the present invention may be used as the entire binder or a part thereof in such compositions which are commonly made into paints and other water-based coating compositions having sufficient volatile base therein to assure a pH therein of at least about 6, preferably about 7.5 to 10, to thereby assure at least partial neutralization of the acid heteropolymer dispersed particles therein. In the production of the acrylic polymer latices, it has been the practice to add a cellulose ether, such as hydroxyethyl cellulose, to stabilize the emulsion polymer dispersion and to aid in the thickening of the coating composition to suitable viscosity for application by brush, roller, etc. Since such ethers are water-soluble, the amount thereof added must either be carefully limited or the coating films become excessively water-sensitive.

The use of the heteropolymer dispersions of the present invention as the binder or as a part of it in such compositions has been found to reduce the need for a cellulose ether and to provide a greater high-shear (i.e. "so-called" ICI) viscosity along with a practical level of low-shear viscosity, i.e. viscosity "at rest", so that settling while standing, as in storage, is reasonably retarded. The increase in high-shear viscosity assures greater coverage during application and the reduced amount of water-soluble cellulose ether provides greater resistance to moisture.

By applying such coating compositions containing a heteropolymer dispersion in which the $T_i$ of the sheath is below or about the ambient temperature of application, the core/sheath particles form a continuous, coalesced film on drying, as explained in the Conn et al patent. If the sole binder of such composition is the heteropolymer dispersion of the present invention in which the $T_i$ of the sheath is above the temperature of application, the layer of coating dries to a layer of uncoalesced polymer particles. In this case, a coalesced film may be obtained by subjecting the coating layer, during or shortly after drying, to a temperature above the $T_i$ of the binder. The heteropolymer dispersion of the present invention may be mixed with a predominant amount of another polymer dispersion, such as an acrylic polymer of the Conn et al patent having a $T_i$ below the ambient temperature of application whereas the sheath of the heteropolymer has a $T_i$ above the ambient temperature. In this instance the heteropolymer serves as a rheology modifier during application and may provide opacifying action by formation of microvoids in the cores of the heteropolymer dispersion.

The heteropolymer dispersion of particles having an alkali-swellable core and a sheath that is film-forming under the conditions of application, preferably having a $T_i$ of 25° C. or below in the case of water-base paints to be applied at room temperature or ambient temperature, can be formulated into paints with substantially improved application performance over state-of-the-art paints. Using state-of-the-art latex binders, one must use significant quantities of water-soluble or highly water-swollen thickeners to impart the necessary rheology to the paint system. Particularly in lower quality paint formulations where binder and pigment are reduced to lower the paint cost per gallon, an exceptionally large quantity of thickener is required and it becomes difficult to achieve the desired paint rheology properties under any conditions.

The heteropolymers having an alkali-swellable core with a film-forming sheath, by their nature absorb water into the center of the particle when they are contacted with alkali, particularly with ammonia or an amine. The water absorbed into the center of the emulsion polymer particle is essentially removed from the paint system and may be thought of as "hidden" within the polymer particles. When paints are formulated with such water-swollen particles, substantially less thickener is required since only the water outside the particles must be thickened. As a result, paints may be formulated with excellent rheological properties without the use of excessive levels of water-soluble or -swellable thickeners. Since these water-soluble or water-swellable thickeners detract from the water- and/or alkali-resistance of the paint film, improvement is obtained in these properties of the resultant paint film.

The film-forming thickeners of the invention, which may be referred to as encapsulated alkali swellable polymer dispersions (EASPs) do not give high viscosity at low shear (Brookfield) when neutralized, particularly with the particle sizes of 0.2 or 0.3 to 1 micron before swelling. Neutralization and swelling causes an increase in volume and size of the dispersed particles, decreases the volume of the continuous phase, thus giving particle crowding, increased high shear viscosity (ICI viscosity) and finally dilatency. Low shear viscosity will increase somewhat due to decrease of continuous phase but is not the major effect. The dispersion goes dilatent before low shear viscosity becomes significant (greater than 1000 cps). This effect is also a function of particle size. Swelling of small particle dispersions, 0.15 micron diameter and under, as in the Kurth et al. patent, may be expected to give high low shear viscosity, incomplete encapsulation and exposure of the acid to the continuous phase probably being the reason.

The high shear viscosity development due to increased volume solids is useful in paints by increasing film build.

Encapsulated alkali swellable cores when properly encapsulated do not titrate with alkali metal bases (titration under normal analytical conditions of about 1 hour and at room temperature). Upon exposure to alkali metal bases (NaOH, KOH) at high pH such as 9.5 for long periods (over 1 day) or at high temperatures, some of the core acid may be titrated, particularly with a soft-sheath. The EASP's are, however, readily titrated by NH4OH or organic bases in a much shorter time at room temperature and swell, taking up water.

Cases which are not completely encapsulated (e.g., Kurth et al. U.S. Pat. No. 3,875,099) appear to cause aqueous phase thickening (probably by solution of the polymer), high low shear (Brookfield) viscosity, and flocculation of the dispersion.

The encapsulated swellable polymer provides the capability of increasing dispersion volume solids by neutralization with NH4OH and gives a film or coating (when dry) in which the encapsulated acid is not available to attack by alkali metal bases as from cementitious substrates or cleaning solutions.

In addition to the importance of $T_i$, the MFT of the film-forming EASP's is important. MFT is the minimum film-forming temperature of the latex particles as the coating is dried, and is determined by the method described in Resin Review, Volume 16, No. 2 (1966).

This is influenced not only by the $T_i$ of the addition copolymer, but by polymer composition and other ingredients such as plasticizers or coalescing agents, if used, and their amounts, the plasticizing effect of water, etc. Such additives to paints thus make shells, having a $T_i$ of greater than ambient temperature, film-forming at the desired temperature.

In the following examples which are illustrative of the invention, the parts and percentages are by weight and temperatures are in degrees Celsius, unless otherwise stated.

EXAMPLE 0

Emulsion Polymerization of Seed Polymers (a) A 5-liter flask equipped with a paddle stirrer, thermometer, nitrogen inlet and reflux condenser is used. Deionized water (2900 g) and 5.5 g of sodium dodecylbenzene sulfonate are heated in the flask to 78° C. under a nitrogen atmosphere with stirring. A monomer emulsion is prepared from 266 g of deionized water, 0.40 g of sodium dodecylbenzene sulfonate, 416 g of butyl acrylate, 374 g of methyl methacrylate and 10.4 g of methacrylic acid. Fifty grams of monomer emulsion is added to the flask and then 3.0 g of ammonium persulfate dissolved in 10 ml. of water. Fifteen minutes later, a gradual feed of the remaining monomer emulsion at 16 g/min. is begun. The temperature is allowed to rise to 85° C. and is maintained there throughout the monomer addition. Fifteen minutes after the monomer addition is completed, the reaction mixture is cooled. At 55° C., 1.0 ml of t-butyl hydroperoxide (70%) and 0.50 g of sodium formaldehyde sulfoxylate dissolved in 20 g of water are added. At 25° C., 10 g of 28% aqueous ammonia is added. The product is filtered through a 100-mesh screen and has pH 9.5, 19.6% total solids and average particle diameter 0.06 micron (light scatter).

(b) A larger seed polymer dispersion is prepared by the same procedure, only the amount of sodium dodecylbenzene sulfonate in the initial charge to the flask is reduced to 2.0 g. The product has a pH of 9.4, 19.5% total solids, and an average particle diameter of 0.095 micron.

EXAMPLE 1

A 5-liter round-bottomed flask is equipped with paddle stirrer, thermometer, nitrogen inlet and reflux condenser. To 2115 g. of deionized water heated to 84° C. in the flask under a nitrogen atmosphere there is added 4.2 g. of sodium persulfate dissolved in 25 g. of water followed by 62 g. of an acrylic seed polymer dispersion of part (b) of Example 0 (19.5% solids, average particle diameter 0.095 micron). A monomer emulsion consisting of 235 g. of deionized water, 0.8 g. of sodium dodecylbenzene sulfonate, B 490 g. of methyl methacrylate, 210 g. of methacrylic acid and 3.5 g. of ethylene glycol diacrylate is added to the kettle over a 3-hour period at 85° C. After the completion of the monomer feed, the dispersion is held at 85° C. for 30 minutes, cooled to 25° C. and filtered to remove coagulum. The filtered dispersion has a pH 2.3, 22.4% solids content and an average particle diameter of 0.35 micron. A dilute sample of the dispersion is neutralized to pH 10 with ammonia. Upon examination with an optical microscope, the average particle diameter is found to be 0.8 micron corresponding to a swelling ratio of around 12 by volume.

EXAMPLE 2

Soft vinyl acetate sheath

A portion of unneutralized alkali-swellable polymer dispersion prepared as in Example 1, but of 0.30 micron diameter and 37.4% solids (28 parts of dispersion, 10.5 parts of solid polymer), 80 parts of water, 0.6 parts of sodium persulfate dissolved in 50 parts of water, and 5.0 parts of 0.1% aqueous ferrous sulfate heptahydrate were stirred in a glass reaction vessel under a nitrogen atmosphere at 60° C. A monomer emulsion (40 parts of water, 0.07 parts of sodium dodecylbenzene sulfonate, 160 parts of vinyl acetate, and 40 parts of butyl acrylate) was added over a 90 min. period along with co-feeds of 0.2 parts of sodium persulfate dissolved in 20 parts of water and 0.6 parts of sodium bisulfite dissolved in 20 parts of water while maintaining the temperature at 60° C. The final particle size was 0.60 micron. None of the core carboxylic acid could be titrated with 0.5N potassium hydroxide.

EXAMPLE 3

A portion of unneutralized alkali-swellable polymer dispersion prepared as in Example 1 but of 0.26 micron diameter and 10.21% solids (87 parts of dispersion, 8.86 parts of solid polymer) is stirred in a glass reaction vessel and heated to 60° C. Then 0.10 part of a 23% solution of sodium dodecyl benzene-sulfonate, 0.068 part sodium persulfate in 2 parts water and 1 part of a 0.1% solution of $FeSO_4.7H_2O$ are added. A monomer emulsion of the following composition is added over a period of 3 hours and 20 minutes while maintaining the temperature at 60° C.

| Water | 20 Parts |
|---|---|
| Sodium Dodecyl Benzene Sulfonate | 0.3 Parts 23% Solution |
| Butyl Acrylate | 72 |
| Methyl Methacrylate | 76 |
| Methacrylic Acid | 1.95 |
| Total | 170.25 Parts |

Concurrently with the monomer emulsion additional catalysts consisting of 0.4 part sodium persulfate in 10 parts water and 0.28 part sodium bisulfite in 10 parts water are gradually added.

Following preparation of the emulsion polymer an aqueous solution of thickener may be added to provide stability and adjust the solids level to about 50%. The particle size of the unneutralized emulsion polymer is 0.67 micron. Upon neutralization of a diluted sample of the product with ammonia the particle diameter increases to about 0.80 micron due to uptake of water.
Calculated unswollen particle diameter
 0.67 Micron
Calculated swollen particle diameter
 0.78 Micron Assuming core swelling to 10X initial volume with $H_2O$.

EXAMPLE 4

The procedure of Example 3 is repeated except 79.7 parts (8.233 parts solid polymer) of a 0.17 micron diameter alkali-swellable polymer dispersion prepared as in Example 1 is used in place of the 0.26 micron diameter dispersion used in Example 3. After heating to 60° C., there is added 0.17 parts of a 23% solution of sodium dodecylbenzene sulfonate. 10 parts water is added to dilute. Other ingredients and process are like those in Example 3.
Calculated unswollen particle diameter
 0.43 micron
Found unswollen particle diameter
 0.43 micron Various factors affect the swelling (water absorption) of film-forming EASP's.

In one method of determining water absorption of ammonium-neutralized film-forming EASP's, the EASP is diluted to 20% solids and neutralized to a pH of 9.5 with ammonium hyroxide and exposed to the conditions specified in the tables and text which follow. A 35 g. sample is then placed on a Sorvall Superspeed Centrifuge for two hours at 14,000 RPM. The supernatant is poured off and its weight is recorded. A control sample is run without neutralization in an identical manner to determine the amount of water that is trapped in interstitial spaces between the particles. (This is used as an approximation since interstitial water in the swollen samples will be slightly greater.) From these two supernatant weights, the amount of water actually taken down by the swollen particles is determined and stated as "$H_2O$/g. polymer solid." The difference between the two numbers divided by the solid weight of polymer in the sample gives the corrected reading of swellability for the EASP.

EASP's containing a larger percentage of core material (higher core/shell ratios) have a greater potential for swelling. In the room temperature case, the 1/10 is approximately double that of a 1/20. Swelling increases with time up to a maximum and then decreases slightly. Heating these systems allows them to reach a swelling point quickly which is unattainable at room temperature.

Deionizing the latices with Amberlite IR-120H further improves their initial ability to swell and allows them to reach maximum swelling.

In all cases, the system containing more of a given core material with a given shell composition exhibits greater swelling (1/10 > 1/13.1 > 1/20).

EXAMPLE 5

The effect of core size on water absorption is evident. Large size cores are able to absorb a greater amount of water. However, use of large size cores may be impractical for paints, but not for other uses, since they lead to excessively large particle sizes which are not currently used as paint vehicles. (A 0.32 micron core grows out to 0.86 micron as a 1/20 and to 0.69 micron as a 1/10). Cores smaller than 0.32 micron could not be used in this series because they do not encapsulate completely using a thermal process even though they would grow out into a more acceptable particle size region. On the other hand, redox initiation at lower temperatures (below about 60° C., e.g., at about 40° C.) permits encapsulation of much smaller cores, e.g., 0.2 micron, or smaller.

| Effect of Core Size on Water Absorption at Room Temp. (g $H_2O$/g polymer solid) | |
|---|---|
| Core Size[1] Microns | 24 hr. |
| 0.20[2] | 0.84 |
| 0.32 | 0.73 |
| 0.36 | 0.77 |
| 0.50 | 0.82 |

-continued

Effect of Core Size on Water Absorption at Room Temp.
(g H$_2$O/g polymer solid)

| Core Size[1] Microns | 24 hr. |
|---|---|
| 0.75 | 0.96 |

[1] 1/20 core/sheath thermal EASP's (values not corrected for interstitial water). Core composition - 5 BA/10 EA/55 MMA/30 MAA//0.5 X-970, sheath 52 BA/46.7 MMA/1.3 MAA.
[2] Only 50% encapsulated by titration (others are 100%). When not fully encapsulated, latices will absorb more water but other properties suffer.

EXAMPLE 6

Core and sheath compositions affect swelling potential of the EASP's.

Shell or sheath composition has little effect on the water absorption of EASP's in these thermal systems. Softening of the shell tends to show a small increase in swelling potential. Harder shells encapsulate more readily than softer ones.

| Low T$_i$ Monomer Sheath[4] | Core | 1/20[5] Thermal EASP's (g H$_2$O/g polymer solid) Room Temperature | | |
|---|---|---|---|---|
| | | 24 hr. | 1 wk. | 2 wk. |
| 46 BA | 5/10/55/30[1] | 0.59 | 0.56 | 0.62 |
| 52 BA | " | 0.64 | 0.71 | 0.68 |
| 60 EA | " | 0.65 | 0.66 | 0.70 |
| 46 BA | 5/65/30[2] | 0.87 | 0.89 | 0.89 |
| 52 BA | " | 0.87 | 0.97 | 0.95 |
| 60 EA[3] | " | 1.05 | 1.10 | 1.13 |

[1] 5 BA/10 EA/55 MMA/30 MAA//0.5 X-970 - 0.29 micron core.
[2] 5 BA/65 MMA/30 MAA//0.5 X-970 - 0.29 micron core.
[3] Only 87% encapsulated by titration with KOH.
[4] X BA or EA/98.7 - X MMA/1.3 MAA.
[5] Core/shell weight ratio.

EXAMPLE 7

The core/shell ratio effect is evident. In all cases the 1/10's have a greater swelling capability than the 1/20's.

Water Absorption of Redox EASP's at Room Temperature
(g H$_2$O/g polymer solids in 24 hours)

| Wt. Ratio Core/Shell | Core Comp.[1] | | | Water Absorption | |
|---|---|---|---|---|---|
| | BA | EA | MMA | Neat | 7.0% Texanol[2] (on solids) |
| 1/10 | 0 | 0 | 70 | 1.03 | 1.20 |
| 1/10 | 5 | 0 | 65 | 1.22 | 1.36 |
| 1/10 | 0 | 5 | 65 | 1.30 | 1.45 |
| 1/10 | 5 | 10 | 55 | 1.38 | 1.53 |
| 1/20 | 0 | 0 | 70 | 0.65 | 0.76 |
| 1/20 | 5 | 0 | 65 | 0.63 | 0.78 |
| 1/20 | 0 | 5 | 65 | 0.70 | 0.82 |
| 1/20 | 5 | 10 | 55 | 0.67 | 0.79 |

[1] 60° C. Redox process; EASP's using 0.22 micron core having 30% MAA; shells are 52 BA/46.7 MMA/1.3 MAA
[2] Trademark for 2,2,4-trimethyl-1,3-pentanediol monoisobutyrate, a coalescent for latex paints.

The addition of 7.0% Texanol as a coalescent causes an increase in their water absorption capabilities. The Texanol plasticizes and softens the external shell of the EASP. Softening of the shell allows an increase in water uptake since there is now less of a resisting force acting on the shell.

EXAMPLE 8

Water uptake of 1/10 Redox EASP's increases as acid content of the core increases in room temperature samples. Upon heat aging for 24 hours, swelling increases except at 40% MAA where it appears to decrease. It is possible that there is an optimal acid level between 30 and 40% where room temperature and heat age swelling will be equal thereby indicating its stability to temperature changes.

For 1/20's, swelling still increases on heating at the 40% acid level. Since 1/20's have shown before that external heat increases their swelling potential, its acid stability level may be higher than 40%.

Effect of Core Acid[1]
(g H$_2$O/g polymer solid)

| Core/Shell | % Core Acid | 24 Hour Room Temperature | 24 Hour 60° C. Heat Age |
|---|---|---|---|
| 1/10 | 10 | 0.08 | 0.25 |
| 1/10 | 20 | 0.76 | 0.98 |
| 1/10 | 30 | 1.02 | 1.13 |
| 1/10 | 40 | 1.51 | 1.24 |
| 1/20 | 30 | 0.69 | 0.81 |
| 1/20 | 40 | 0.93 | 1.05 |

[1] 60° Redox EASP's, 0.22 micron core, shell - 52 BA/46.7 MMA/1.3 MMA, core XMAA/100-XMMA/0.5 X-970.

EXAMPLE 9

EASP, 1 core/20 sheath-styrene in shell
1 part core-10 EA/60 MMA/30 MAA/0.5 X-970
10 parts sheath-52 BA/46.7 MMA/1.3 MAA
10 parts sheath-52 BA/46S/2MAA An unneutralized alkali-swellable polymer dispersion prepared as in Example 1 but of 0.22 micron diameter, of the composition 10 parts ethyl acrylate, 60 parts methyl methacrylate, 30 parts methacrylic acid, together with 0.5 part butanediol dimethacrylate, and having 14.73% T.S. (total solids; 106.5 parts of dispersion, 15.7 parts solid polymer) is added to 70 parts of water in a glass reaction vessel, stirred and heated to 60° C. Then 0.08 part of a 23% solution of sodium dodecyl benzene sulfonate, 0.14 part sodium persulfate in 8 parts water and 1 part of a 0.1% solution of FeSO$_4$.7H$_2$O are added.

Two monomer emulsions of different compositions are prepared and added in sequence (A followed by B) over a period of 3 hours and 25 minutes while maintaining the temperature at 60° C.

| | A Parts | B Parts |
|---|---|---|
| Water | 20 | 20 |
| Sodium dodecylbenzene sulfonate (23% soln.) | 0.3 pts soln. | 0.3 pts. soln. |
| Butyl Acrylate | 78 | 78 |
| Methyl Methacrylate | 70 | — |
| Styrene | — | 69 |
| Methacrylic Acid | 1.95 | 3 |
| Total | 170.25 | 170.3 |

Concurrently with the monomer emulsion additional catalysts consisting of 0.8 part sodium persulfate in 20 parts water and 0.56 part sodium bisulfite in 20 parts water are gradually added.

The particle size of the unneutralized film-forming emulsion polymer is 0.61 micron. The alkali-swellable portion is completely encapsulated as determined by the fact that the acid in this portion is not reacted when the latex is titrated with aqueous potassium hydroxide. Upon neutralization with aqueous ammonia the particle diameter increases due to uptake of water.

EXAMPLE 10

EASP, 1 core/20 sheath, four fifths of shell is crosslinkable 1 part core 5 BA/65 MMA/30 MAA+1.5 X-970
4 parts sheath 52 BA/46 MMA/2 MAA
16 parts sheath 95 EA/4 AM:MOAM; 1:1 mol ratio/1 AA (AM is acrylamide and MOAM is methylolacrylamide)

A portion of unneutralized alkali-swellable polymer dispersion prepared as in Example 1 but of 0.22 micron diameter, a composition of 5 parts butyl acrylate, 65 parts methyl methacrylate, and 30 parts methacrylic acid, together with 1.5 parts butandiol dimethacrylate and having 29.43% solids (63.6 parts of dispersion, 18.44 parts solid polymer) is added to 160 parts water in a glass reaction vessel, stirred and heated to 40° C. Then 0.16 parts of a 23% solution dodecylbenzene sulfonate, 0.16 part sodium persulfate in 5 parts water, and 4 parts of a 0.1% solution of FeSO$_4$.7H$_2$O are added.

Two monomer emulsions of different compositions are prepared and added in sequence (A followed by B) over a period of 2 hours and 10 minutes. The temperature is allowed to increase to 60° C. during the addition of A and then to 85° C. during the addition of B.

|  | A |  | B |  |
|---|---|---|---|---|
| Water | 10 | Water | 80 |  |
| Sodium dodecylbenzene sulfonate | 0.16 pts 23% soln. | Sodium dodecylbenzene sulfonate | 3 pts. 23% soln. |  |
| Butyl Acrylate | 39 | Ethyl Acrylate | 28.7 |  |
| Methyl Methacrylate | 34.5 | 50% soln. of |  |  |
| Methacrylic Acid | 1.5 | Methylol acrylamide and acrylamide 1:1 mol ratio | 23.7 |  |
|  |  | Acrylic acid | 3 |  |
| Total | 85.16 |  | 138.4 |  |

Concurrently with the monomer emulsion, additional catalysts consisting of 1 part sodium persulfate in 24 parts water and 0.7 part sodium bisulfite in 24 parts water are gradually added.

The final particle size of the unneutralized film-forming emulsion polymer is 0.61 micron. The alkali-swellable portion is completely encapsulated as determined by the fact that the acid in this portion is not titrated with introduction of aqueous potassium hydroxide. Upon neutralization with aqueous ammonia the particle diameter increases due to uptake of water. Coatings of the polymer emulsions are crosslinked by heating after drying.

EXAMPLE 11

High temperature process. 87% encapsulated.
1 part core 5 BA/10 EA/65 MMA/30 MAA+0.5 X-970
20 parts shell 60 EA/38.7 MMA/1.3 MAA A portion of unneutralized alkali-swellable polymer dispersion prepared as in Example 1 but of 0.29 micron diameter, the composition being 5 parts butyl acrylate, 10 parts ethyl acrylate, 55 parts methyl methacrylate, and 30 parts methacrylic acid together with 0.5 part butanediol dimethacrylate and having 29.3% solids (51.2 parts of dispersion, 15 parts solid polymer) is added to 140 parts water in a glass reaction vessel and stirred. 0.17 parts of a 23% solution of sodium dodecyl benzene sulfonate is added and the vessel and contents heated to 85° C. 0.8 parts sodium persulfate in 20 parts water is added and the following monomer emulsion gradually added over a period of 3 hours at a temperature of 85° C.

| Monomer Emulsion | | |
|---|---|---|
| Water | 40 | |
| Sodium dodecyl benzene sulfonate | 0.8 | pts (23% solution) |
| Ethyl Acrylate | 180 | |
| Methyl Methacrylate | 116 | |
| Methacrylic Acid | 3.9 | |
| Total | 340.70 | |

The major portion of the alkali-swellable portion of this polymer emulsion is encapsulated as shown by titration with aqueous potassium hydroxide. At about 20°±2° C. (room temperature) 87% of the alkali swellable acid is not titrated by aqueous potassium hydroxide over a period of less than 1 hour, corresponding to 87% encapsulation. The final unswollen particle diameter is 0.78 micron. This polymer emulsion when diluted and neutralized with ammonium hydroxide swells, increasing the particle diameter. 0.65 grams water per gram polymer is taken up in swelling as determined after separation by centrifugation.

EXAMPLE 12

Three water-base paints are prepared, one from a commercial acrylic latex polymer of the type embraced by the disclosure in U.S. Pat. No. 2,795,564, having a particle size intermediate that of the two heteropolymer dispersions obtained in Examples 3 and 4 and having approximately the same composition as the sheath of Examples 3 and 4. In the following Table I, the paints made from the polymers of Examples 3 and 4 are designated A and B respectively and that from the commercial latex is designated C. All three paints are formulated at 30% volume solids and 26.4% pigment volume solids and then there is added sufficient hydroxyethyl cellulose thickener (available under the tradename Natrosol ®250MR) to obtain an approximately equal low-shear viscosity. As shown in the table, only half as much hydroxyethyl cellulose is required by the heteropolymer paints A and B as by the commercial paint C. Also paints A and B have greater high-shear viscosity and concomitant greater film-build at natural spreading rate.

TABLE I

| Paint | Thickener[2] (lbs./100 gal Paint) | Viscosity Low[3] Shear | Viscosity High[4] Shear | Film-Build (g/sq. ft.) |
|---|---|---|---|---|
| A | 2.3 | 90 | 1.6 | 13.6 |
| B | 2.0 | 87 | 1.2 | 12.5 |
| C | 4.7 | 93 | 0.8 | 11.2 |

[2]Hydroxyethyl Cellulose
[3]Stormer viscosity in Krebs Units
[4]Viscosity at high shear (10,000 reciprocal seconds) in poise as measured by a cone and plate viscometer developed by Imperial Chemical Industries.

While the immediately preceding example shows advantages obtained by complete replacement of the water-insoluble emulsion polymer binder used in making an aqueous base paint with an aqueous dispersion of a core/sheath heteropolymer of the present invention, benefits can be obtained when an aqueous coating composition is formulated with a blend of latices (as the binder) comprising at least about 5% by weight of a dispersion of a water-insoluble core/sheath heteropolymer of the present invention and up to 95% by weight of an aqueous dispersion of a water-insoluble vinyl addition polymer of the type conventionally used in making aqueous coating compositions for use as water-base paints, as coating compositions for painting and dyeing of textile fabrics, and so on. The proportions given in the preceding sentence refer to the solids content of the blended polymer dispersions, the dispersions being supplied at solids contents of about 45 to 70% weight percent, on even lower or higher polymer solids content. The other latex blended with the core/sheath heteropolymer dispersion to form the binder may be any vinyl addition polymer dispersion (i.e., latex or emulsion polymer) of the types commonly employed in the art at formulating aqueous coating compositions, such as acrylic dispersions disclosed in the Conn et al. patent mentioned hereinabove, polymers and copolymers of vinyl acetate, especially with vinyl chloride, vinylidene chloride; polymers of styrene or vinyltoluene with acrylic esters or butadiene; and especially emulsion copolymer dispersions of the various types mentioned which contain a small amount of acid copolymerized in the dispersed water-insoluble copolymer so that the coating compositions can be effectively used at a pH in the range of about 8 to 12, preferably at 8 to 10, without dissolving of the dispersed polymers in the blend which serves as the binder.

The following formulation may be used to prepare a water-base paint:

| Component | Parts |
| --- | --- |
| Grind (Pigment Paste) | |
| Dispersant (e.g. 25% Tamol 731) | 10.6 |
| Defoamer (e.g., Nopco NDW) | 2.0 |
| Propylene Glycol | 68.4 |
| Titanium Dioxide (e.g. RCL-9) | 263.5 |
| Let-Down | |
| Propylene Glycol | 49.2 |
| Coalescent (e.g., Texanol), optional | 13.0 |
| Wetting Agent (e.g. Triton GR-7M) | 2.0 |
| Water | 50.9 |
| Preservative (e.g., Super Ad-It) | 1.0 |
| Binder (50% solids) | 412.4 |
| Defoamer | 3.0 |
| Cellulose ether (e.g. hydroxyethyl) | 0 to 5 |
| Water, to make a total of | 1064 parts |
| The resultant paint has: | |
| Pigment volume concentration | 26.4% |
| Volume solids | 29.8% |
| Weight solids | 44.6% |

As stated above, when a 50% solids aqueous dispersion of an acrylic polymer that is in widespread commercial use (namely Rhoplex ®AC-388) is made into a paint by the formulation just described, 4.7 parts of dry hydroxyethyl cellulose (paint C in Table I) is needed to provide a low-shear viscosity suitable for brushing. In contrast, when the binder is one of the alkali-swellable core/sheath polymers of the present invention, only 2 to 2.3 parts of the hydroxyethyl cellulose is needed to obtain the same low-shear viscosity. The binder may comprise a blend of a heteropolymer dispersion of the present invention with a commercial latex or emulsion copolymer dispersion in which the polymer solids of the heteropolymer is at least about 5% by weight of the total polymer solids of the binder blend. Preferably, the relative proportions between the dispersed water-insoluble heteropolymer of the present invention and the other binder component comprising a vinyl addition polymer may be from 10:90 weight ratio to 90:10 weight ratio (solids basis). Both the heteropolymer and the other (vinyl addition polymer) component may be film-forming at ambient conditions of use.

Thus, the present invention contemplates the preparation of aqueous coating compositions comprising the mixing of the aqueous core/sheath heteropolymer dispersion of the present invention with an aqueous dispersion of a water-insoluble particulate material selected from (a) pigments, (b) extenders (e.g., silica, china clays, etc. mentioned in the Conn et al. patent, supra), and (c) vinyl addition polymers, especially those containing a small amount (e.g. ½ to 3 or even up to about 5 weight percent) of an acid, such as acrylic acid, methacrylic acid, and itaconic acid, which are film-forming at ambient temperatures and (d) mixtures of such particulate materials as are mentioned in (a), (b), and (c), adding a volatile basic swelling agent to raise the pH to about 8 to 12 or higher, thereby at least partially neutralizing the acid of the cores and swelling them, depositing a film of the composition on a solid substrate to be coated and/or impregnated and subsequently drying the film. Generally, the advantages of the use of the heteropolymer dispersion are noticeable when there is used an amount of such dispersion as will provide a quantity of core/sheath polymer solids that is at least 5% by weight of the total solids of the particular dispersions (a), (b), (c), or (d), and the benefits become more pronounced as the proportion of the core/sheath heteropolymer increases to 10% or higher, the most notable effect being observed when the proportion is increased to the range of 50% to 95% of the total particulate materials (solids).

The compositions are useful not only in the field of paints but also in many other fields. For example, pigmented compositions may be applied to paper to provide coated products of various types. Grease-proof papers may be so prepared. Compositions may be modified with additional pigments and extenders, ratios of 4:1 to 30:1 of pigment to binder being best for coating of paper. The coated papers may be given a high gloss by a mild buffing.

Other interesting applications of the dispersions of interpolymers of this invention include their use as quicktack adhesives, particularly for paper and cardboard, their use as additives for increasing the viscosity of solutions of urea-formaldehyde or melamine-formaldehyde condensates, or their use for sealing, priming, or coating leather. The dispersions may be added, to textile finishing baths to improve the bulk, drape, and handle of textile fabrics. They may also be used to improve the abrasion resistance of fabrics and to decrease the lint available therefrom. They are also valuable for preparing pastes for the printing of textiles such as canvas.

Similar compositions are desirable as sealers on felts. They can be applied to cement, stucco, concrete and other porous bodies to seal pores and prevent dusting and flaking.

Another interesting utility is the separation of ammonia or amines from aqueous solutions such as of inorganic salts or bases. Ion exchange resins and the like are not normally useful to selectively remove ammonia or amines from such solutions.

COMPARATIVE EXAMPLE A

A portion of unneutralized alkali swellable polymer dispersion prepared in Example 1 (71 parts of dispersion, 16 parts of solid polymer) is stirred in a glass reaction vessel and heated to 81° C. A solution of 0.1 part of ammonium persulfate in 3 parts of water is added. A monomer mixture of 22 parts of ethyl acrylate, 10 parts of methyl methacrylate and 0.4 parts of methacrylic acid is added gradually over a two-hour period while maintaining the temperature at 81° C. After the completion of the monomer addition, the temperature is held at 81° C. for 39 minutes until greater than 98% of the monomer has reacted. The product is cooled to 25° C. and filtered through cheesecloth. The solids content is 45% and the average particle diameter 0.6 micron. A dilute sample of the product is neutralized at 25° C. with ammonia to pH 10. The particle diameter increases to 1.1 micron due to uptake of water.

This two-stage polymer dispersion is used to thicken a commercial latex: 100 g. of Rhoplex ®AC-64 (61% solids) is diluted with water to 40% solids giving a watery consistency (10 cps); fifteen grams of the two-stage polymer dispersion is added and the pH is adjusted to 10 with ammonia; the Brookfield viscosity (spindle, 3, 60 rpm) rises to 3000 cps.

The low core:shell ratio of 1:2 and the high temperature, led to less than 50% encapsulation of the core as determined by titration with KOH; thus, the high low shear viscosity.

COMPARATIVE EXAMPLES B-1 AND B-2

For comparative purposes, alkali swellable core-sheath polymers were prepared according to the prior art (Example 1 of Kurth et al. U.S. Pat. No. 3,875,099)

Example B-1: Ammonium persulfate (0.50 g) and 0.70 g of a commercial emulsifier which is the reaction product of nonylphenol with 4 moles of ethylene oxide, subsequently sulfated and converted into the sodium salt (2.5 g of Alipal CO-433, 28% active) are dissolved at 80° C. in 400 g. of deionized water in a two-liter flask equipped with a condense, stirring apparatus, and monomer feed pump. Over a period of eight minutes, an emulsion priorly prepared from 16.5 g. of methyl methacrylate, 16.7 g. of butyl acrylate, 5 g. of methacrylic acid 0.07 g. (active) of the aforementioned emulsifier, 0.05 g. of the aforementioned initiator and 20 g. of deionized water, is added dropwise to the solution at 80° C. with stirring. Subsequently, an emulsion comprising 478.5 g. of methyl methacrylate, 483.3 g. of butyl acrylate, 1.79 g. (active) of the aforementioned emulsifier, and 500 g. of deionized water is added at 80° C. over a period of 232 minutes along with a cofeed of 1.45 g. of the aforementioned initiator dissolved in 50 g. of deionized water. After everything is added the latex is bluish, viscous, relatively free of coagulum, with a particle diameter of around 0.1 micron. The pH is adjusted to 7.5 with aqueous ammonia. Almost immediately, the latex turns white, the viscosity drops and coagulum forms showing that the latex is unstable and is agglomerating. The batch is held at 80° C. for two hours and then cooled to 50° C. At this point, 50 g. of the reaction product of 1 mole of isononylphenol with 100 moles of ethylene oxide (diluted with a three-fold amount of water) is added. The batch is cooled to 25° C., adjusted to pH 9.6 with aqueous ammonia and filtered through a 100 mesh screen. The wet coagulum weighs 150 g. The solids content of the dispersion is 46.8% and the viscosity is 42 centipoises (II/60). The dispersion is examined by means of optical microscopy; the particle size distribution is broad ranging from 0.5 to 2 microns in diameter. A portion of the final dispersion is treated with Amberlite IR-120 to remove ammonia and then titrated polentiometrically with 0.5N potassium hydroxide: the titer of carboxylic acid is 0.033 meq per gram of solid polymer (pKa 8.2). The theoretical titer of copolymerized methacrylic acid is 0.055 meq per gram of solid polymer so that 60% of the polymerized methacrylic acid is titrated with the potassium hydroxide, indicating only about 40% encapsulation.

Example B-2: A second dispersion is prepared by the same recipe as used for the first except for a few changes to prevent agglomeration that occurred in the first: in the initial kettle charge, the amount of ammonium persulfate is increased to 5.0 g. and the water is increased to 410 g.; the amount of water in the second monomer emulsion is increased from 500 to 550 g. and Alipal CO-436, the ammonium salt analog of Alipal CO-433, is substituted throughout using an equal weight of active ingredient. A dispersion free of coagulate is obtained. The solids content is 46.35 and the viscosity at pH 10 is 55 centipoises (II/60). The titer carboxylic acid is 0.060 meq per gram of solid polymer (pKa 8.2): all of the polymerized methacrylic acid is titrated by the potassium hydroxide, indicating no encapsulation. The particle sizs of the dispersion is 0.21 micron as estimated by light scatter.

The large quantity of anionic emulsifier of Kurth et al. Example 1, in our experience with similar emulsifiers, would give extremely small first stage particles of about 0.05 micron. The core composition having a high level of butyl acrylate, the similarity of the first stage and second stage monomer compositions, and possibly other factors such as polymerization temperature, appear to have contributed to the lack of encapsulation encountered with the procedure of the Kurth et al Example 1. The other Kurth et al. examples are even further away from the invention.

Hydrophilic monomers are mentioned hereinabove. Suitable ones include (meth)acrylamide, vinyl acetate, hydroxyethyl (meth)acrylate, hydroxypropyl (meth)acrylate, dihydroxypropyl (meth)acrylate, diacetone (meth)acrylamide, N-vinyl pyrrolidone, methoxyethyl (meth)acrylate di- and triethylene glycol (meth)acrylate, polyethylene glycol (meth)acrylate, and (meth)acrylonitrile.

We claim:
1. A process of making an aqueous dispersion of water insoluble core/sheath polymer particles in which the core contains sufficient acid groups to render the core swellable by neutralization with a volatile base to at least twice its volume and the sheath is permeable to said base, comprising
   (a) sequentially emulsion polymerizing at a temperature of from about 10° to about 100° C. in an aqueous medium containing a free radical initiator: one or more monoethylenically unsaturated core monomers having a group of the formula —HC=C<, at least one of which has a carboxylic acid group, emulsified in the medium, the core monomer(s) comprising a hydrophilic monomer selected from

(i) a non-acid monomer copolymerized with at least 5% of a carboxylic acid monomer, and (ii) 15–100% of said acid monomer when no other hydrophilic monomer is present, based on the weight of the monomers utilized to prepare the core polymer particles to thereby form dispersed core polymer particles, said core particles having an average diameter of from about 0.05 to 1 micron, the core monomers having no more than 40% of butyl acrylate or no more than an amount of an equivalent monomer which would give a comparable $T_i$ when using the same comonomer combination, and (b) then adding to the polymer dispersion resulting from (a) at least one monoethylenically unsaturated sheath monomer having no ionizable group to form a sheath polymer on the core particles, any monoethylenically unsaturated carboxylic acid in the sheath monomer mixture being present in an amount of no more than 10% by weight of the sheath monomers, the proportion of carboxylic acid in the sheath monomer mixture being less than ⅓ the proportion thereof in the core monomer mixture, the core/sheath particles having an average diameter before neutralization and swelling of from about 0.07 to 4.5 microns, relative amount of core-forming monomer(s) and sheath-forming monomer(s) being such that the ratio of the weight of the core to the weight of the total polymer in the resulting dispersed particles is from about 1:4 to 1:100, said sheath being permeable at 20° C. to an aqueous volatile base selected from ammonia and amines, and essentially impermeable at 20° C. to fixed or permanent bases including sodium, potassium, calcium or magnesium hydroxide, the exterior sheath having a $T_i$ of below about 25° C. or below or about the ambient temperature of application, said sheath being film forming, the core polymer being relatively hard or crosslinked, the particles being film forming:

(c) neutralizing with ammonia or amine so as to swell said core.

2. A process according to claim 1 wherein the acid in (a) is selected from the group consisting of acrylic acid, methacrylic acid, acryloxypropionic acid, methacryloxypropionic acid, acryloxyacetic acid, methacryloxyacetic acid, monomethyl acid maleate, monomethyl acid itaconate, crotonic acid, and mixtures thereof, at least about 85% of the core particles being encapsulated as evidenced by titration with an alkali metal hydroxide.

3. A process according to claim 2 wherein the acid in (a) is selected from the group consisting of acrylic acid and methacrylic acid.

4. A process according to claim 1 wherein at least about 85% of the core particles are encapsulated as evidenced by titration with aqueous potassium hydroxide.

5. The process of claim 4 in which the formation of dispersed core particles in (a) is a multistage process involving first, the preparation of a seed polymer from monoethylenically unsaturated monomers which may or may not comprise a monomer containing an acid group, and a second stage polymerization on the seed particles of ethylenically unsaturated monomers comprising (1) 5 to 100 weight % of a carboxylic acid, (2) 0 to 95 weight % of at least one monoethylenically unsaturated monomer lacking an ionizable group, and (3) 0 to 20 weight % of a polyethylenically unsaturated monomer thereby obtaining said core particles (a) and in which the core particle average diameter is from about 0.1 to about 0.5 microns in unswollen condition, and the subsequently polymerized sheath particles have an overall size of up to about 2.0 microns in unswollen condition.

6. The process of claim 5 in which the acid is selected from the group consisting of acrylic acid, methacrylic acid, acryloxypropionic acid, methacryloxypropionic acid, acryloxyacetic acid, methacryloxyacetic acid, monomethyl acid maleate, monomethyl acid itaconate, crotonic acid, and mixtures thereof, and the core monomer(s) comprise(s) at least 15% of said acid.

7. The process of claim 6 in which the acid is selected from the group consisting of acrylic acid, methacrylic acid, and mixtures thereof, said sheath being film-forming under conditions of use, and the core/sheath particles have an average diameter of from about 0.2 to about 2.0 microns in an unswollen condition, in which 0.1% to 3% of a polyunsaturated crosslinking monomer is included in the core monomer mixture.

8. A process of claim 4 in which the formation of the sheath in (b) is multistage process.

9. The process of claim 2 in which the sheath monomers consist of those which are monoethylenically unsaturated whereby said exterior sheath is not crosslinked.

10. The product obtained by the process of claim 1, 2, 3, 4, 5, 6, 7, 8, or 9, such product being useful as a thickening agent in an aqueous medium containing sufficient volatile base to at least partially neutralize the product to a pH of at least 6.

11. The process of claim 1 which comprises the additional steps of mixing an aqueous core/sheath heteropolymer dispersion obtained with an aqueous dispersion of a particulate material selected from pigments, extenders, vinyl addition emulsion polymers, and mixtures thereof to form a coating composition, adding a volatile basic swelling agent to raise the pH of the composition to about 6 to 10 or higher, thereby at least partially neutralizing the acid of the cores and swelling the heteropolymer cores, depositing a film of the composition on a solid substrate to be coated and/or impregnated and subsequently drying the film.

12. A composition for coating/or impregnating a substrate comprising a core/sheath polymer prepared according to claim 1 or 7 in which the core/sheath polymer is in swollen condition by virtue of the neutralization with a volatile base.

13. A composition for coating or impregnating a substrate comprising (1) a film-forming vinyl addition polymer either dissolved or dispersed in an aqueous medium and (2) a core/sheath particulate polymer dispersion product of claim 25 or 31.

14. A composition adapted for coating and/or impregnating comprising an aqueous dispersion of a water-insoluble emulsion vinyl addition polymer, a core/sheath product of claim 1 or 7, an inorganic pigment and optionally an extender.

15. The composition of claim 10 in which the exterior sheath of the core/sheath product has a $T_i$ of −40° C. to +23° C.

* * * * *

UNITED STATES PATENT AND TRADEMARK OFFICE
CERTIFICATE OF CORRECTION

PATENT NO. : 4,468,498

DATED : August 28, 1984

INVENTOR(S) : Alexander Kowalski and Martin Vogel

It is certified that error appears in the above-identified patent and that said Letters Patent is hereby corrected as shown below:

Title page, left column, at [75], "Robert M. Blankenship, Lansdale" should be deleted.

Column 10, line 59, "B" should be deleted.

Column 20, line 29, after "titer" --of-- should be inserted.

Column 22, line 58, "25 or 31" should be --1 or 6--.

Signed and Sealed this

Twenty-ninth Day of July 1986

[SEAL]

Attest:

DONALD J. QUIGG

Attesting Officer

Commissioner of Patents and Trademarks